US008731300B2

United States Patent
Rodriguez Serrano et al.

(10) Patent No.: US 8,731,300 B2
(45) Date of Patent: *May 20, 2014

(54) HANDWRITTEN WORD SPOTTER SYSTEM USING SYNTHESIZED TYPED QUERIES

(71) Applicant: Xerox Corporation, Norwalk, CT (US)

(72) Inventors: Jose A. Rodriguez Serrano, Grenoble (FR); Florent C. Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/678,961

(22) Filed: Nov. 16, 2012

(65) Prior Publication Data

US 2013/0156302 A1  Jun. 20, 2013

Related U.S. Application Data

(63) Continuation of application No. 12/212,964, filed on Sep. 18, 2008, now Pat. No. 8,335,381.

(51) Int. Cl.
*G06K 9/18* (2006.01)
*G06K 9/62* (2006.01)
*G06K 9/72* (2006.01)

(52) U.S. Cl.
USPC ............................ 382/186; 382/156; 382/159

(58) Field of Classification Search
None
See application file for complete search history.

(56) References Cited

U.S. PATENT DOCUMENTS

| | | | | |
|---|---|---|---|---|
| 5,315,668 A | * | 5/1994 | O'Hair | 382/159 |
| 5,438,630 A | * | 8/1995 | Chen et al. | 382/159 |
| 5,644,652 A | * | 7/1997 | Bellegarda et al. | 382/186 |
| 5,825,919 A | * | 10/1998 | Bloomberg et al. | 382/177 |
| 5,841,902 A | * | 11/1998 | Tu | 382/187 |
| 5,844,991 A | * | 12/1998 | Hochberg et al. | 382/218 |
| 5,933,525 A | * | 8/1999 | Makhoul et al. | 382/186 |
| 6,151,574 A | | 11/2000 | Lee et al. | |
| 6,501,855 B1 | | 12/2002 | Zelinski | |
| 7,646,913 B2 | * | 1/2010 | Abdulkader et al. | 382/187 |
| 7,715,629 B2 | * | 5/2010 | Abdulkader | 382/186 |
| 7,848,573 B2 | * | 12/2010 | Wecker et al. | 382/186 |
| 7,983,478 B2 | * | 7/2011 | Liu et al. | 382/161 |
| 8,014,603 B2 | | 9/2011 | Serrano et al. | |

(Continued)

FOREIGN PATENT DOCUMENTS

EP  1 693 784 A2  8/2006

OTHER PUBLICATIONS

A. Agarwal, et al., Hyperfeatures—Multilevel Local Coding for Visual Recognition, *ECCV06*, 2006, pp. 1-14.

(Continued)

*Primary Examiner* — Thomas Conway
(74) *Attorney, Agent, or Firm* — Fay Sharpe LLP (57) ABSTRACT

A wordspotting system and method are disclosed for processing candidate word images extracted from handwritten documents. In response to a user inputting a selected query string, such as a word to be searched in one or more of the handwritten documents, the system automatically generates at least one computer-generated image based on the query string in a selected font or fonts. A model is trained on the computer-generated image(s) and is thereafter used in the scoring the candidate handwritten word images. The candidate or candidates with the highest scores and/or documents containing them can be presented to the user, tagged, or otherwise processed differently from other candidate word images/documents.

24 Claims, 7 Drawing Sheets

(56) References Cited

U.S. PATENT DOCUMENTS

| 8,027,540 | B2 | 9/2011 | Serrano et al. | |
| 8,045,798 | B2 | 10/2011 | Blessan et al. | |
| 8,077,973 | B2* | 12/2011 | Dong | 382/186 |
| 8,224,092 | B2 | 7/2012 | Bressan | |
| 2007/0005356 | A1* | 1/2007 | Perronnin | 704/245 |
| 2007/0258648 | A1* | 11/2007 | Perronnin | 382/224 |
| 2008/0069456 | A1* | 3/2008 | Perronnin | 382/228 |

OTHER PUBLICATIONS

B. Gatos, et al., A Segmentation-Free Approach for Keyword Search in Historical Typewritten Documents, *In Proc. of the 8th Int'l Conf. On Document Analysis and Recognition*, 2005, pg. 1-5.

G. Csurka, et al., Visual Categorization with Bags of Keypoints, *Proc. ECCV Intl. Workshop on Statistical Learning in Computer Vision*, 2004, pgs. 1-16.

J. Edwards, et al., Making Latin Manuscripts Searchable Using gHMM's, *In Proc. of NIPS*, 2004, pp. 1-8.

T.M. Rath, et al., Features for Word Spotting in Historical Manuscripts, *In: Proc. of the 7th Int'l Conf. on Document Analysis and Recognition*, ISSN 0-7695-1960-1, pp. 218, 2003.

Huang, et al. "Semi-continuous hidden Markov models in isolated word recognition", IEEE Pattern Recognition, $9^{th}$ Int'l Conference, 1988, pg. 406-408.

Bhardwaj, et al. "Script independent word spotting in multilingual documents" $2^{nd}$ Int. Workshop on Cross lingual information access, 2008, Sep. 6, 2008, pp. 48-54.

Srihari, et al. "Spotting words in Latin, Devanagari and Arabic scripts" Vivek :Indian Journal of Artificial Intelligence, 2006, vol. 16, No. 3, pp. 2-9.

Marinai, et al. "Font adaptive word indexing of modern printed documents" Transactions on Pattern Analysis and Machine Intelligence, vol. 28, No. 8, Aug. 1, 2006, pp. 1187-1199.

Manmatha, et al. "Word spotting: a new approach to indexing handwriting" Proc. of the 1996 IEEE Computer Society Conf. on Computer Vision and Pattern Recognition, Jun. 18-20, 1996, pp. 631-637.

* cited by examiner

| Font type | mAP |
|---|---|
| Kunstler Script | 21.35 |
| French Script | 19.41 |
| Lucida handwriting | 17.94 |
| Harlow Solid | 12.39 |
| Comic Sans | 11.46 |
| Gigi | 10.95 |
| Papyrus | 10.17 |
| Freestyle Script | 10.13 |
| Rage Italic | 9.15 |
| Poor Richard | 8.46 |
| Forte | 7.62 |
| Lucida Caligraphy | 7.61 |
| Tempus Sans | 6.38 |
| Viner Hand | 6.11 |
| Brush Script | 5.91 |
| Monotype corsiva | 5.21 |
| Ravie | 4.68 |
| Times New Roman | 4.39 |
| Verdana | 3.75 |
| Arial | 3.58 |
| OCR A Extended | 3.57 |
| Bradley hand | 3.55 |
| Matura MT Script | 2.56 |
| Juice ITC | 0.95 |
| Courier New | 0.73 |

FIG. 7

HANDWRITTEN WORD SPOTTER SYSTEM USING SYNTHESIZED TYPED QUERIES

This application claims the benefit as a Continuation of U.S. application Ser. No. 12/212,964, filed on Sep. 18, 2008 entitled HANDWRITTEN WORD SPOTTER USING SYNTHESIZED TYPED QUERIES, by José A. Rodriguez-Serrano, et al., the disclosure of which is incorporated herein by reference in its entirety.

CROSS REFERENCE TO RELATED PATENTS AND APPLICATIONS

The following copending applications, the disclosures of which are incorporated herein in their entireties by reference, are mentioned:

U.S. application Ser. No. 11/847,742, filed on Aug. 30, 2007 (now U.S. Pat. No. 8,045,798), entitled FEATURES GENERATION AND SPOTTING METHODS AND SYSTEMS USING SAME, by Bressan, et al.;

U.S. application Ser. No. 11/847,757, filed on Aug. 30, 2007 (now U.S. Pat. No. 8,014,603), entitled SYSTEM AND METHOD FOR CHARACTERIZING HANDWRITTEN OR TYPED WORDS IN A DOCUMENT, by Serrano, et al.;

U.S. application Ser. No. 12/014,193, filed on Jan. 15, 2008 (now U.S. Pat. No. 8,027,540), entitled ASYMMETRIC SCORE NORMALIZATION FOR HANDWRITTEN WORD SPOTTING SYSTEM, by Serrano, et al.; and U.S. application Ser. No. 12/169,101, filed Jul. 8, 2008 (now U.S. Pat. No. 8,224,092), entitled WORD DETECTION METHOD AND SYSTEM, by Bressan, et al.

BACKGROUND

The exemplary embodiment relates generally to recognition of handwritten words in document images without having to detect or identify the individual characters making up the words or the full text. The exemplary embodiment finds application in document processing, analysis, sorting, detection, word spotting, and related arts.

Text of electronically encoded documents tends to be found in either of two distinct formats, namely bitmap format and character code format. In the former, the text is defined in terms of an array of pixels corresponding to the visual appearance of the page. A binary image is one in which a given pixel is either ON (typically black) or OFF (typically white). A pixel can be represented by one bit in a larger data structure. A grayscale image is one where each pixel can assume one of a number of shades of gray ranging from white to black. An N-bit pixel can represent $2^N$ shades of gray. In a bitmap image, every pixel on the image has equal significance, and virtually any type of image (text, line graphics, and pictorial) can be represented this way. In character code format, the text is represented as a string of character codes, the most common being the ASCII codes. A character is typically represented by 8 bits.

There are many applications where it is desirable for character strings to be extracted from a document or a portion thereof which is in bitmap format. For example, a document may be available only in a printed version. In the domain of automated document processing, for example, a common task involves the categorization of documents. Many of the documents to be categorized are received in paper form, either because of their "legal" significance, as a backlog of old documents to be archived, or as general-purpose correspondence, and they need to be classified. Various techniques exist for classifying documents, whether based on the aspect of documents, on the textual content, or based on templates. All these techniques have their specific advantages and drawbacks.

There are a number of applications where the identification of whole words rather than individual characters or recognition of the full text is sufficient. For example, in some applications, it may be desirable to identify whether documents, such as incoming mail, include one or more specific words. These documents may then be processed differently from the rest of the mail. For example, an organization dealing with contracts may wish to identify documents which include keywords such as "termination" or "cancellation" so that such documents can receive prompt attention. Other organizations may wish to characterize documents according to their subject matter for processing by different groups within the organization.

It has been shown that identification of whole words is more robust for degraded images containing broken and touching characters. One system, based on hidden Markov models (HMMs), represents words as a concatenation of single-state character HMMs. This system employs segmentation of the characters prior to feature extraction. Another system uses multiple-state HMMs to model characters without requiring segmentation of words into characters.

When such word spotting techniques are used for handwritten documents, a codebook is generated for the words of interest. This generally involves collecting a large number of handwritten samples for each word of interest, to be used in training of the system. As a result, such systems are often limited to the detection of a limited set of keywords.

A method which is able to identify handwritten words in a document image quickly without the need for assembling a large collection of training samples of the words of interest is thus desirable for a variety of applications.

INCORPORATION BY REFERENCE

The following references, the disclosures of which are incorporated herein in their entireties by reference, are mentioned:

U.S. Pat. No. 5,841,902 to Tu discloses a character recognition system which includes a character input device, such as a stylus and tablet or optical scanner, for receiving inputted characters, and a processor. The processor determines which of a number of model characters best matches the inputted character. The processor extracts a feature value vector from the inputted character and compares it to the mean feature value vector of each class of characters. The processor recognizes the inputted character as the model character corresponding to the mean feature value vector which is closest to the feature value vector of the inputted character. The processor also constructs a database from multiple specimens of each model character. The processor organizes the specimens of each model character into multiple classes. The processor then determines the mean feature value vector of each class.

U.S. Pat. No. 5,438,630 to Chen, et al. and U.S. Pat. No. 5,825,919 to Bloomberg, et al. are both directed to methods for word identification which are based on features of the entire word, without the need for segmentation or OCR, and without the need to recognize non-keywords. In the method of Chen, for example, font-independent character models are created using Hidden Markov Models (HMMs) and arbitrary keyword models are built from the character HMM components. Word or text line bounding boxes are extracted from the image. A set of features based on the word shape (and optionally also the word internal structure) within each bounding box is extracted. This set of features is applied to a network that includes one or more keyword HMMs.

The above-mentioned U.S. application Ser. Nos. 11/847,742; 11/847,757; 12/014,193; and 12/169,101 all relate to word spotting.

The following references disclose visual categorization systems: U.S. Pub. No. 2007/0005356, entitled GENERIC VISUAL CATEGORIZATION METHOD AND SYSTEM, by Perronnin; U.S. Pub. No. 2008/0069456, entitled BAGS OF VISUAL CONTEXT-DEPENDENT WORDS FOR GENERIC VISUAL CATEGORIZATION, by Perronnin; U.S. Pub. No. 2007/0258648, entitled GENERIC VISUAL CLASSIFICATION WITH GRADIENT COMPONENTS-BASED DIMENSIONALITY ENHANCEMENT, by Perronnin; A. Agarwal and B. Triggs, "*Hyperfeatures—Multilevel Local Coding for Visual Recognition*", ECCV06, 2006; and Csurka, Dance, Fan, Willamowski and Bray, "Visual Categorization With Bags-Of-Keypoints", Proc. ECCV International Workshop on Statistical Learning in Computer Vision, 2004.

BRIEF DESCRIPTION

In accordance with one aspect of the exemplary embodiment, a method includes receiving a query string. At least one computer-generated image is generated, based on the query string. A model is trained on the at least one computer generated image. Candidate handwritten word images in a collection are scored using the trained model. Based on the scores, a subset of the word images is identified.

In another aspect, a computer implemented processing system includes a synthesizer which synthesizes at least one computer-generated image based on a received query string. The system includes a model which is trained on features extracted from the at least one computer-generated image. A scoring component scores candidate handwritten word images in a collection against the model and, based on the scores, identifies a subset of the handwritten word images.

In another aspect, a computer implemented method for wordspotting includes receiving a query string to be searched for in a collection of candidate handwritten word images extracted from one or more documents. For each of a set of fonts, the method includes automatically generating an image based on the query string. A semi-continuous hidden Markov model is used for modeling the query string. A subset of its parameters is estimated based on features extracted from the images in the different fonts. Other parameters of the model have been previously trained on sample handwritten word images without consideration of the query string. The candidate handwritten word images are scored against the trained semi-continuous hidden Markov model and, based on the scoring, one or more word images, or a document containing the word image, are labeled with the query string.

DETAILED DESCRIPTION

Aspects of the exemplary embodiment relate to an apparatus and method for spotting handwritten words in document images and to a computer program product which includes instructions for performing the exemplary method.

The exemplary method for word identification is based on features of the entire word, without the need for segmentation into individual characters or OCR, and without the need to recognize non-keywords. In one embodiment, a sliding window is translated across a word image and features extracted from image data in the windows.

Above-mentioned U.S. application Ser. Nos. 11/847,742 and 11/847,757, filed on Aug. 30, 2007, and Ser. No. 12/169,101, filed on Jul. 8, 2008, incorporated herein, disclose methods for word spotting in which a sliding window is traversed stepwise across an image, which is presumed to be a word, and at each step, features within the window are extracted. The extracted features can then be compared with features of known words stored in a database, often referred to as a codebook.

The exemplary embodiment obviates the need for collecting handwritten samples of the query string for use as training data by automatic generation of training examples in different typographic fonts which correspond to an input query string that is to be searched for in a handwritten document image.

In various aspects, a system and method are disclosed for searching any query string in a collection of handwritten document images. A query string, as used herein, includes a set of characters in a selected order, such as a word, short phrase, numbers, or the like, which is to be searched for and identified, where present, in a document image. The query strings to be identified are generally known words in a particular natural language, such as English or French, but need not be. The query string can be, for example, a name of a person, company, or product, a word likely to be present in documents of interest, or the like. The types of query strings which can be searched are limited only by the set of the characters which can be used for inputting a typed query string which is to be searched. For example, on an alphanumeric keyboard, the query string may be generated from a character set comprising the 26 letters of the alphabet, in both upper and lower case, the numbers 0-9, and other symbols, such as punctuation as well as symbols, such as $, €, and &. All of the characters in the character set can be automatically generated in a plurality of different fonts.

The exemplary embodiment is discussed in the context of binary images. In this context, the term "image" refers to a representation of a two-dimensional data structure composed of pixels. A binary image is an image where a given pixel is either "ON" (active) or "OFF" (inactive). Pixels are generally defined to be active if they are black and inactive if they are white. It should be noted that the designation of black as ON and white as OFF reflects the fact that most documents of interest have a black foreground and a white background. It is to be appreciated that the exemplary method is not limited to black and white images but is appropriate to images of any suitable color separation or separations. Negative images may be converted to positive images, if desired, prior to processing.

Handwritten word images are generally images of single (or sometimes multiple) words and/or numbers comprising handwritten text, which have been extracted from a document image. Each handwritten word image may comprise a character string comprising a group of characters, such as letters and/or numbers) which are sufficiently closely grouped together to allow the word image to be distinguished from other word images in the document. By "candidate handwritten word images," it is meant that the word images are derived from images of handwritten documents. However, since the process of extracting the images can be fully automatic, it is to be appreciated that it cannot be guaranteed that every candidate handwritten word image is actually an image of handwritten word, but is none-the-less treated as a handwritten word during processing. The handwritten documents from which the candidate handwritten word images are obtained are often in a cursive script, and are generated manually, using a pen or pencil or other writing implement, i.e., without the use of a mechanical device such as a typewriter, word processor, or computer. It is to be appreciated that some handwritten documents to be searched may include both handwritten words as well as typed words, which can both be queried at the same time.

Figure 1:
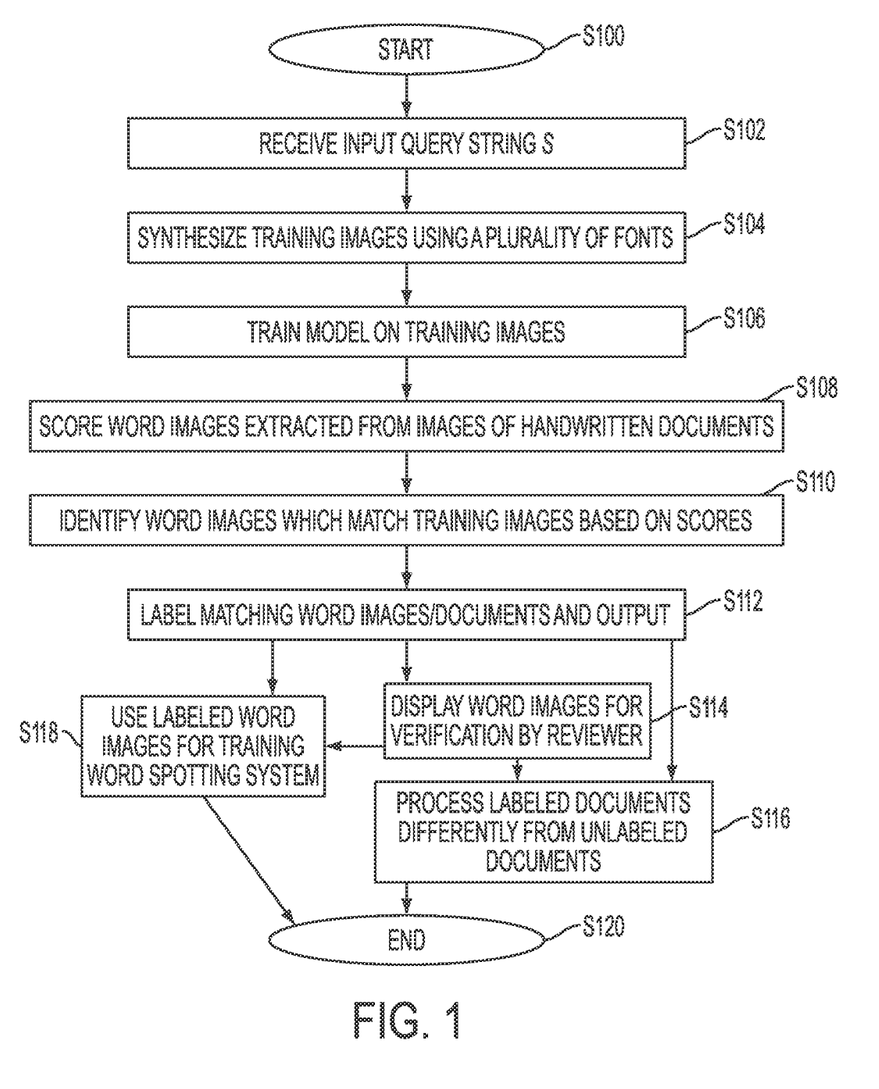
FIG. 1 is a flowchart which illustrates an exemplary method for spotting handwritten words in document images.
Figure 2:
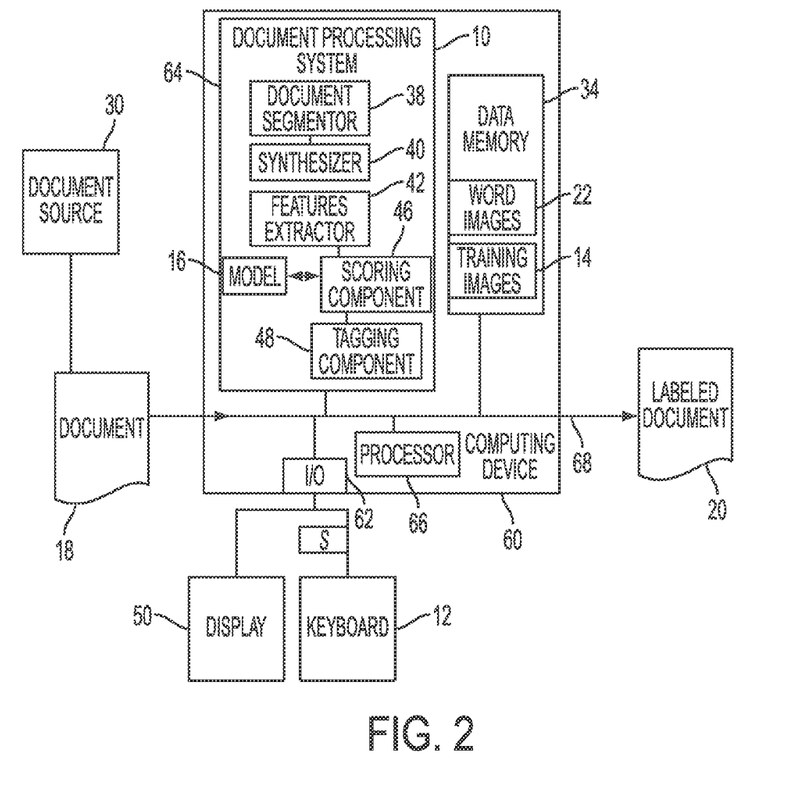
FIG. 2 is a schematic functional block diagram of a system for spotting handwritten words in document images which may be used to perform the method of FIG. 1.

FIG. 1 illustrates steps of an exemplary automated method for identifying handwritten text corresponding to a query string in images of handwritten documents. The method may be implemented with a system 10 as illustrated in FIG. 2, which is described in greater detail below. The method presumes that a collection of candidate handwritten word images have been extracted from one or more documents. A method for extracting these word images is described below. However, it is also contemplated that the word images may be extracted subsequent to input of a user's query, for example, from specific document(s) identified by a user.

The method begins at S100.

Figure 3:
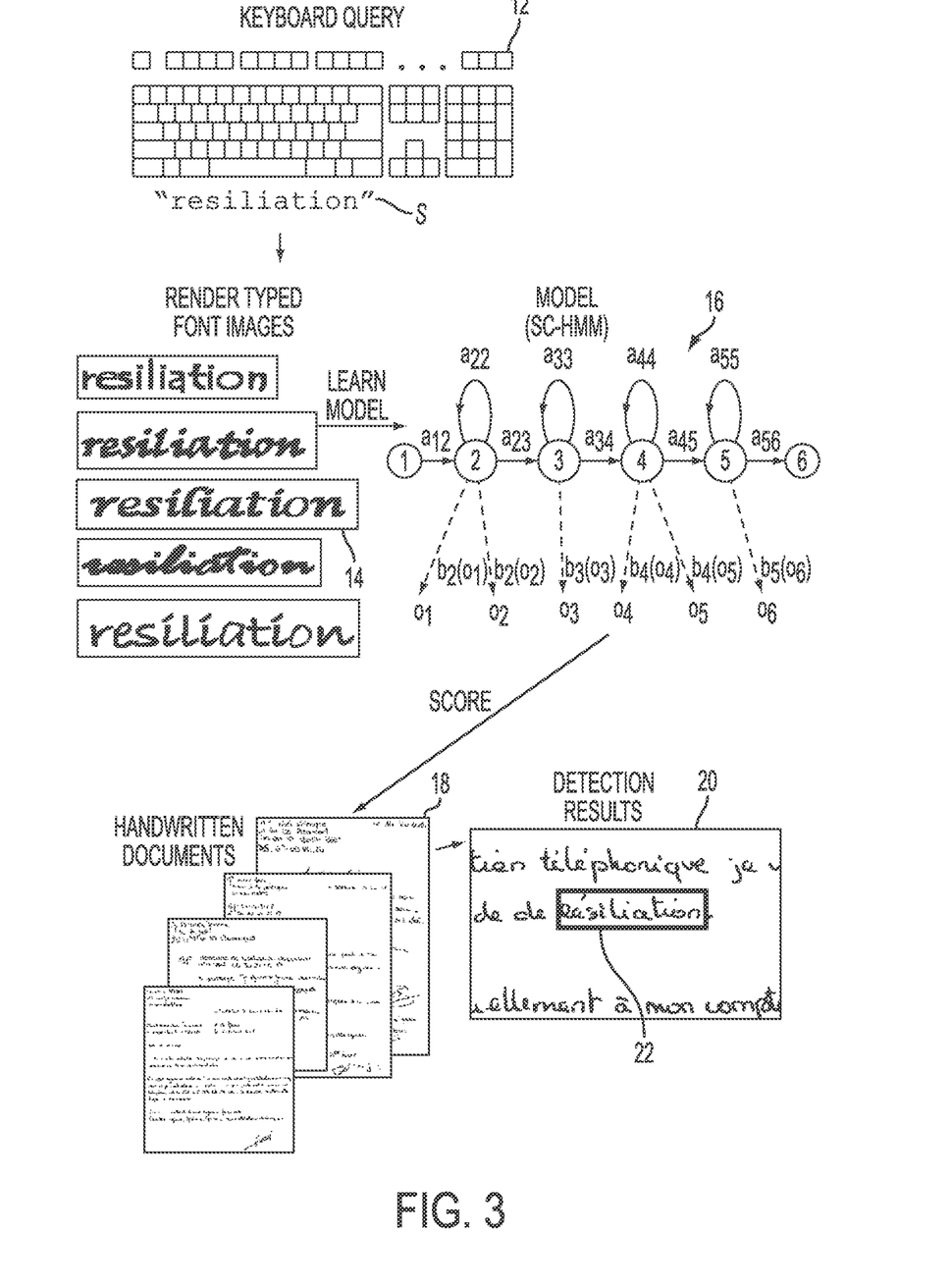
FIG. 3 graphically illustrates aspects of the method of FIG. 1.

At S102, a selected query string S to be searched in a collection of candidate handwritten word images is input, for example, by a user typing the query string on an input device, such as a keyboard. For example, the user may type the word resiliation on a keyboard 12, as illustrated in FIG. 3.

At S104, given a typed query, multiple samples 14 are generated by varying only the font. Specifically, a set of computer-generated images (training examples) 14 of the query string is automatically rendered using different computer typographic fonts. For example, as shown in FIG. 3, the word resiliation has been rendered in five different fonts, to provide a set of rendered type font images 14 although fewer or more fonts may be employed. While in the exemplary embodiment, a plurality of font types are used, in another embodiment, a single font is used to generate a single computer-generated image. In one embodiment, additional samples may be generated which do not replicate the query string exactly. Such "noisy" samples may include common misspellings or spelling variations of the query word formed by adding one or more letters, deleting one or more letters, or replacing one or more letters. For example, in addition to rendering the word resiliation in a plurality of different fonts, the word resilliation could be rendered in a plurality of fonts.

At S106, a model 16 is trained on the training examples 14. More particularly, as described in greater detail below, features are extracted from patches of each of the training examples 14 and used to train the model 16. One model can be trained on all examples or separate model can be trained for each example.

At S108, samples comprising a collection of candidate handwritten word images which have been extracted from a document or collection of documents are scored, based on the trained model 16.

Based on the scores, a determination may be made as to whether each sample has a likelihood of corresponding to the input query string (S110). For example, the samples in the collection are scored using the model and a score-dependent result is returned, such as the top-N ranked samples or samples with a score higher than a fixed threshold. These top scoring samples may be labeled appropriately.

At S112, documents 18 which contain one or more of the matching samples may be labeled and output.

In one embodiment, at S114, labeled documents 20, or relevant portions thereof, may be displayed to a reviewer, with the matching samples (word images) 22 highlighted, e.g., as shown in FIG. 3. The person reviewing the images may reject any document(s) 20 where the highlighted sample does not, in the reviewer's opinion, correspond to the typed query.

Alternatively, or additionally, at S116, a processing operation may be performed in which labeled documents 20 are processed differently from untagged documents. For example, labeled documents may be processed as a priority. Or, labeled documents may be indexed in a database according to their query word labels.

In yet another embodiment, the matching word images 22 are themselves used as training examples to train a wordspotting system of the type described in above-mentioned application Ser. Nos. 11/847,742; 11/847,757; 12/014,193; and 12/169,101 (S118), i.e., the method is used to find handwritten training samples which can be used in the generation of a codebook.

The method ends at S120.

In the exemplary embodiment, the user enters a search for a single word. If a user types more than one word as the query string in S102, these may be split into two or more query strings and a model 16 trained for each query string at S106. At S112, only documents which contain samples of each of the query words, optionally further limited by being in close proximity in the document 20, may be tagged. In another embodiment, the user may be asked to select one word of the query to be searched first.

The method illustrated in FIGS. 1 and 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 1, can be used to implement the exemplary wordspotting method.

FIG. 2 illustrates an exemplary computer-implemented wordspotting system 10 suitable for performing the exemplary method. Documents 18 to be processed by system 10 are received from a suitable source 30 of such documents, such as a scanner, camera, data storage device, or the like. Each document 18 may comprise one or more digital pages, each page comprising one or more images, such as binary images. In one aspect of the exemplary embodiment, the documents 18 to be processed comprise scanned images of physical documents which include text that may be handwritten (e.g., in cursive script), such as correspondence. During processing, document images 18 and handwritten word images 22 extracted therefrom may be stored in data memory 34, incorporated into or otherwise accessible to the system 10.

The system 10 includes various processing components, which may be embodied in hardware and/or software. These components may include a document segmentor 38 which processes a document image to identify a collection of candidate handwritten word images 22, generally by identifying clusters of active pixels which are surrounded by inactive pixels. The segmentor 38 operates without consideration of the individual characters which form the handwritten word image. A handwritten word image 22 can thus comprise any object which is capable of being identified as a discrete entity by the particular segmentation techniques being used.

A user input device 12, such as a keyboard, keypad, trackball, touch screen, voice recognition input device, or the like, in communication with the system 10, allows a user to input a selected query string S. A character string synthesizer 40 receives as input a query string S from the user input device 12 and, based on the query string, generates a plurality of training images 14 using different typographic fonts.

A features extractor 42 extracts features from the synthesized training images 14. In the exemplary embodiment, the features are extracted from patches generated by a sliding window, which is translated stepwise across the training image 14, e.g., in the manner described in any one of U.S. Ser. Nos. 11/847,742; 11/847,757; 12/014,193; and 12/169,101.

The same features extractor 42 can be used for extracting features from the collection of candidate handwritten word images 22. Alternatively, the documents may be preprocessed by a separate system (not shown) and the extracted features of the extracted word images stored in data memory 34.

A statistical model 16 is learned on the features extracted from the training images 14.

A scoring component 46 scores candidate handwritten word images 22 in the collection, based on the trained model 16. A tagging component 48 tags high-scoring handwritten word images and/or those documents 18 containing the high-scoring handwritten word images as being a possible match for the query string, e.g., with XML tags, which may also identify the locations of the matching word images 22 in the document. The tagged documents 20 may be then output by the system 10. In one embodiment, the tagged documents 20 are output to a display 50, which displays the tagged documents, or relevant portions thereof. The illustrated display 50 can be a liquid crystal display (LCD), a plasma display, a cathode ray tube (CRT) display, a projection display, or the like. The document image may be highlighted, as shown in FIG. 3, or otherwise modified to indicate a possible match for the query string identified by the system 10, e.g., for verification by the user using the user input device 12.

Alternatively, the tagged documents 20 may be automatically output for further processing, such as OCR recognition or the like.

The system 10 may be hosted by any suitable computing device or devices 60 that is capable of processing data, such as a general purpose computer, e.g., a desktop or laptop computer or a PDA or the like or a dedicated computing device, such as a web-based server, network server, or the like. The computing device may include an input/output (I/O) device 62 for communicating with the keyboard 12 and display 50, either directly, as shown, or via a computer network. In one embodiment, the display 50 and keyboard 12 may form part of a user's computing device (not shown) which is linked to the host computer 60 via a wired or wireless link, such as a LAN or WLAN, e.g., the Internet.

Each of the processing components 38, 40, 42, 46, 48 of system 10 may be in the form of software, hardware, or both. In the exemplary embodiment, the processing components 38, 40, 42, 46, 48 may be in the form of software instructions, stored in main memory 64 of the computing device 60 or elsewhere, for performing the exemplary method described with reference to FIG. 1. A processor 66, such as a central processing unit, or separate processors for each component, in communication with the memory 64, executes the software instructions for performing analysis and markup of the document(s) 18. While the system 10 is shown as having five processing components 38, 40, 42, 46, 48, it is to be appreciated that two or more components may be combined or a component divided into two or more components. Components 38, 40, 42, 46, 48 may all be resident in computing device 60 or may be otherwise accessible thereto. The various components of the computer 60 may be all connected by a data control bus 68.

The memories 34, 64 can include random access memory (RAM), read-only memory (ROM), a hard disk, optical disk, or so forth and may be all physically located in the computing device or parts thereof may be accessible to the computing device, e.g., via a local area network or the Internet. Data memory 34 may be a part of the main memory 64 or separate therefrom. The data memory 34 may store data, including a document 18, extracted word images 22, synthesized word images 14, optionally, the trained model 16, and the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Further details of the exemplary system and method will now be described.

Selection of Fonts for Synthesis of Training Images

Type fonts which approximate handwritten script, such as Kunstler Script, French Script, and Lucida handwriting, tend to provide good training samples 14, while more geometric scripts, such as Courier, Times New Roman, and Arial, are less effective. In general a variety of different font types such as at least three or at least four different font types may be used for synthesizing samples of each query string. Having a very large number of font types, however, does not necessarily ensure the best results. Accordingly, experiments may be performed in which various combinations of font types are used, to identify a group of fonts which yield optimum results.

Extracting Word Images

Techniques for extracting word images 22 are described, for example, in above-mentioned U.S. application Ser. Nos. 11/847,742; 11/847,757; 12/014,193; and 12/169,101. Briefly, a segmentation algorithm extracts sub-images that potentially represent words, employing state-of-the-art techniques based on projection profiles and clustering of gap distances.

Figure 4:
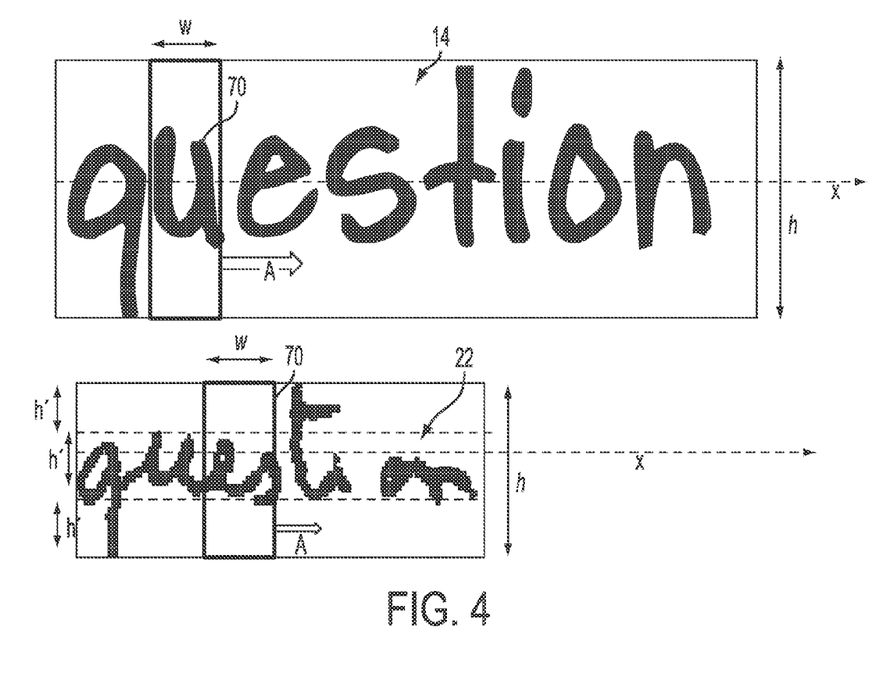
FIG. 4 illustrates the extraction of features from a synthesized word image and from a handwritten word image.

As illustrated in FIG. 4, the extracted word images 22 are normalized with respect to slant, skew and text height. The extracted word images are generally normalized to a fixed height h. This may include normalization of ascender, main body, and descender regions of the word image to a height h' corresponding to a fixed number of pixels, such as 18 pixels each, so that a word image having both ascender and descender regions will have a height of 54 pixels. Since the main body height is approximately proportional to the width of an individual character in the character string, normalization helps to generate word images with a length which is approximately proportional to the number of characters in the string.

The training images 14 are similarly normalized to a fixed height h.

Extraction of Features

Features are extracted from patches of the image (word image 22 or training image 14). As illustrated in FIG. 4, the patches are generated by translating a sliding window 70 of fixed height h and width w across the normalized image in a single dimension x in the direction of arrow A, generally corresponding to the direction in which the word was written/synthesized. The window 70 is displaced horizontally in steps of a regular interval, such as one or a few pixels, or of a variable interval, so that multiple patches are extracted from each image 14, 22.

One advantage of this sliding window approach is that it preserves the left-to-right nature of the writing. As will be appreciated, for scripts which use a vertical rather than a horizontal alignment of characters, such as Chinese, the displacement can be in the vertical rather than the horizontal direction., i.e., along the same axis as the stepwise translation.

For each patch, one or more features (local appearance descriptors) are extracted. The features can be extracted for the window image as a whole or portions thereof. Various methods for extracting features are described for example, in U.S. application Ser. Nos. 11/847,742; 11/847,757; 12/014,193; and 12/169,101.

For example, features may be obtained for key points, cells, gradient orientations of pixels, or the like, which may then be concatenated to form a features vector, or histogram, which represents the window image (patch) as a whole. The dimensionality of the vector can be reduced, for example, using principal component analysis (PCA).

Training the Model (S106)

Various types of models 16 can be trained for generating a representation of the extracted features of the training images, such as hidden Markov models (HMMs), support vector machines, neural networks, or the like. In one embodiment, a semi-continuous hidden Markov model (SC-HMM) is used. Its particularity is that some parameters of the model (such as means and covariance matrices) are constrained to a universal background model (UBM) that is a way of modeling the vocabulary of the handwritten data. Thus even when trained with typed text images, the optimal parameters of the model have to "match" the handwritten vocabulary. This allows a better capability of linking typed and handwritten text.

The SC-HMM may be trained on local gradient histogram features, as described in application Ser. No. 12/169,101. In this method, for each normalized image, a sequence of gradient-based feature vectors is computed from the patches extracted as the window moves from left to right over the image.

The exemplary model 16 includes a first model, which is trained on the training sample(s) 14, and a second model for the background (UBM). In the first model, each training sample $w_n$ is modeled with an HMM. The UBM may be modeled with a Gaussian mixture model (GMM) which is trained on features extracted from a large dataset of samples (containing a large number of words and writing styles), such as a previously obtained set of handwritten documents without consideration to the query word. Accordingly, the training samples for the background model can be automatically extracted from handwritten documents and can therefore include a large collection of different words and the query string need not be present among them.

In an SC-HMM, the same pool of Gaussians (Gaussian functions) that is used for the UBM is also shared by all the states of all training samples. In the HMM, each training sample $w_n$ is represented by probabilities for a set of states (or patterns), each state being modeled by Gaussians from the pool.

For example, let $p_k$ denote the probability density of Gaussian k in the pool of K Gaussians (with mean vector $p_k$ and covariance matrix $\Sigma_k$). Let $p_{n,s}$ denote the emission probability in state s of word $w_n$. Then the probability of emitting the feature vector x in this state may be written as:

$$p_{n,s}(x) = \sum_{k=1}^{K} w_{n,s,k} p_k(x).$$

The mixture weights $w_{n,s,k}$ are the only word- and state-specific parameters.

The steps of the training process may be as follows. First, the background GMM parameters $\lambda_{gmm}$ are trained on all samples of the training data set (or a random selection thereof) regardless of whether or not they correspond to the query word S. This step may be performed before the query word is input and the GMM parameters stored in memory to be used for all input query words. Then, when the query word S is input, the SC-HMM is initialized from the GMM and the $\lambda_n^{hmm}$ HMM parameters are trained using only samples of word $w_n$.

The means $\mu_k$ and covariance matrices $\Sigma_k$ of the SC-HMM (i.e., the parameters of the shared pool of Gaussians) model the basic shapes which are encoded by the feature vectors, such as characters, parts of characters, connectors between characters, etc. These parameters are derived from the background model. As each state models a word part, the mixture weights $w_{n,s,k}$ of a given state s model which basic shapes best describe the corresponding word part.

The score of a sample 22 may be obtained by a likelihood ratio, as discussed in above-mentioned application Ser. No. 12/014,193, in a process called score normalization. In this sense, SC-HMMs are attractive models because the same background UBM can be used for score normalization, thus coming at little extra computational cost. Using a GMM background model works very well in practice because it models both the distribution of word image patterns and of writing styles. Thus, if the word $w_n$ contains very frequent patterns (e.g., if it contains frequent letters), then many word images are likely to score high on an ordinary HMM of $w_n$. However, as the GMM models the distributions of patterns found in any word image, then a word image containing frequent patterns will also score high on the GMM background model, which is factored into the SC-HMM.

The universal background model (UBM) may comprise, for example, about 512 Gaussians trained using a large number (e.g., 1,000,000) of feature vectors randomly extracted from a set of documents. The SC-HMM is trained on top of this UBM and may use about 10 states per character.

Scoring Word Images (S108)

To score a word image 22, the sequence of feature vectors X of a word image are scored against a modeled word $w_n$. For example, the likelihood ratio $$\frac{p(X \mid w_n)}{p(X)}$$

may be employed where $p(X|w_n)$ is the likelihood of X on the model of $w_n$ and $p(X)$ is the likelihood of X on a background model. $p(X|w_n)$ can be obtained using, for instance, the forward or the Viterbi algorithms, while $p(X)$ is the product of the individual probabilities of the features of X on the GMM. Other functions of $p(X|w_n)$ and $p(X)$ may also be considered, such as a log likelihood of the difference between the two. The overall word score is then based on the likelihood ratios (average, sum, product, or the like, with the likelihood rations being optionally weighted to account for location within the word image).

Identification of Matching Samples (S110)

The results can be presented in a variety of ways. In one embodiment, the samples 22 can be ranked according to their scores, with the top N being considered possible matches. The value of N may be selected to be appropriate for the size of the collection of samples 22. In a large collection, N may be correspondingly large, e.g., about 25, whereas for a collection extracted from a single document, N may be as low as 1. In another embodiment, the samples with scores greater than a fixed threshold value are displayed. In yet another embodiment, at least the most highly ranked sample is displayed.

In another embodiment, the fewer than all of the candidate handwritten word images in the collection are scored. For example, if the user wishes to identify a document written by a certain person and inputs the name of the person as the query string, when the system identifies a word image which meets a threshold score, processing of further word images may be halted. For example, the document or portion thereof containing the name may be presented to the user for verification. If it is not deemed to be a correct match, processing of further samples 22 may continue.

The exemplary system 10 has been demonstrated to provide an acceptable performance even though it is not trained on a set of handwritten examples of the query word, but only on a set of typed text examples. While the performance may not match that which can be achieved when using actual handwritten samples of the query string, a significant advantage is that typed text images for a given string can be rendered automatically and in a variety of fonts. This allows a training set to be obtained in a completely automated manner and in a relatively short time. The word spotting system thus allows any word to be searched in a handwritten document collection without providing a single training example.

Another advantage is that it allows querying for any word. Since handwritten examples of the query word need not be provided, the system 10 is not limited to the words for which a representative number of examples can be collected. In the exemplary system, models do not need to be trained beforehand (other than for the universal background part of the model) because they can be trained on the fly, thus resulting in an easier interface.

Specific applications of the exemplary system and method include:

1. Finding infrequent keywords, such as specific person names or address names.

2. Finding handwritten examples in a text corpus which can then be used as a training set for a wordspotting system. This can lead to an improved wordspotting system without the costs usually employed in collection of actual handwritten samples as these are costly to collect. The exemplary method can thus serve as a preliminary step for finding a training set in a semi-automatic way. The retrieved handwritten samples can be manually checked and the correctly retrieved samples can be used to train a better model for spotting the corresponding word.

3. Querying documents in multiple languages. This may be achieved by first translating the query string S into a number of languages, generating word images 14 for each translated word, and performing searches in a collection of multilingual documents. This embodiment would be particularly useful for organizations working in countries with multiple official languages (Switzerland, Belgium, India, etc.) or international institutions (such as the EU parliament).

Without intending to limit the scope of the exemplary embodiment, the following Example demonstrates one application of the system and method.

EXAMPLE

A database consisting of a set of actual scanned letters written in French was used for evaluation of the method. The database included considerable variability in writing styles, artifacts and other anomalies such as spelling mistakes. The occurrences of a set of ten keywords in the database were labeled for evaluation purposes. All the keywords were known to be common words in the dataset (such as Monsieur, Madame, contrat, résiliation, résilier, abonnement, and veuillez).

A set of the scanned letters was subjected to the method described above, including segmentation and normalization to obtain a set of candidate word images. For each candidate word image 22, a sequence of 128-dimensional local histogram features was extracted.

For the SC-HMM 16, a universal background model (UBM) of 512 Gaussians was trained using 1,000,000 feature vectors randomly extracted from word images 22 from a first set of 105 letters. The SC-HMMs involved in the examples below were trained on top of this UBM and used 10 states per character.

The performance of the detection task was evaluated in terms of the average precision (AP) measure, common in information retrieval. AP indicates the average precision of a recall-precision plot. In the following examples, training examples 14 were generated for each of the keywords and a mean average precision (mAP) determined for the ten keywords (mAP).

Example 1

Evaluation of Fonts

Figure 5:
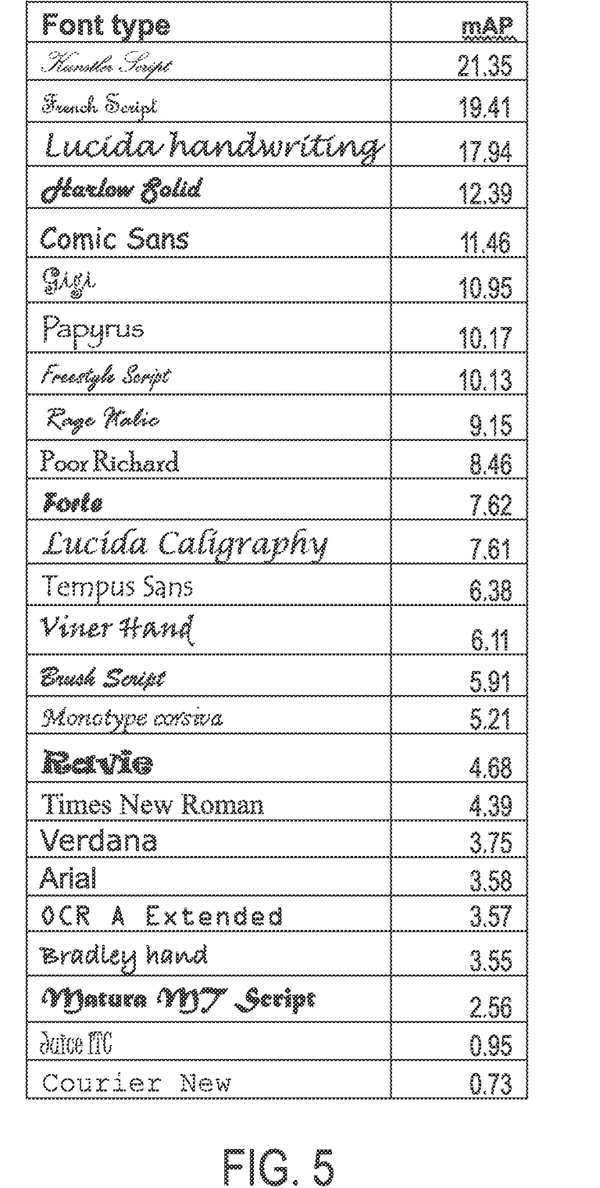
FIG. 5 illustrates mean average precision for a variety of fonts when the system was tested on a collection of candidate handwritten word samples.

FIG. 5 illustrates the mAP for each of a set of different font types. In this example, a single image 14 was generated for each keyword in the selected font type. It can be seen that the best ranked fonts in terms of mAP are more handwritten-like, while the classical typed fonts (Times, Arial, Verdana, Courier) have much lower mAPs. As will be appreciated, these results, while relatively low even for the best font types, are for single font types. An improvement in mAP can be achieved when a set of font types are used to train the model, as shown below.

Example 2

Evaluation of a System Trained with Multiple Fonts

From Example 1, the best performing fonts were identified from their mAP values. Tests were performed using N training samples synthesized using the best performing N fonts. Different values of N were tested. The best result was obtained when using the best 9 fonts (N=9). This gave a mAP of 32.16%. Using all 25 fonts (N=25) lead to inferior results, an mAP of 23.95%. Thus in further examples, training examples of the keyword in the top 9 fonts were used to train each keyword model 16. Candidate handwritten word images from the dataset were then tested against each of the 10 models 16.

Figure 6:
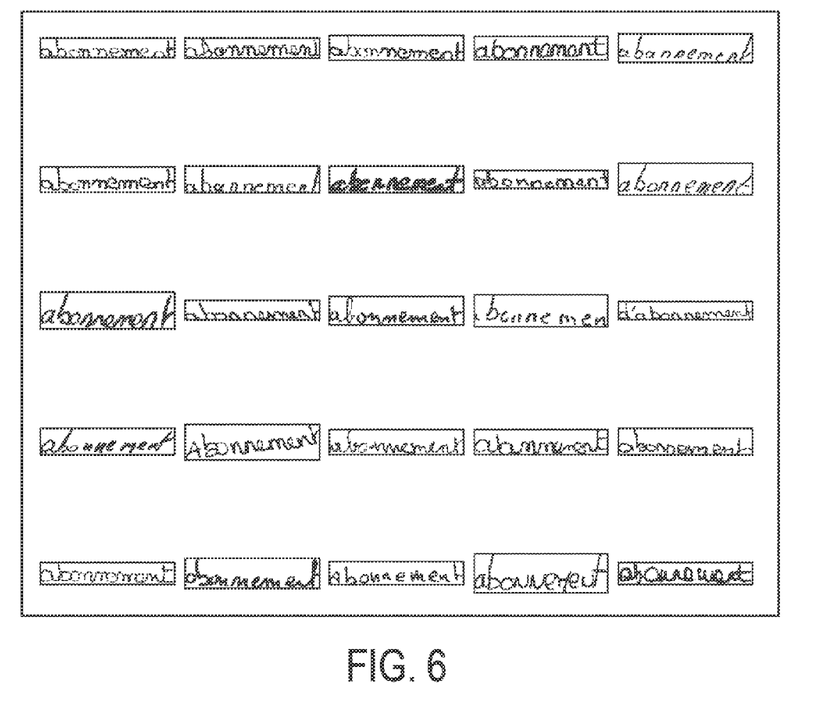
FIG. 6 illustrates the top twenty-five scoring matches for the query string "abonnement", where all twenty-five matches correspond to the query string.
Figure 7:
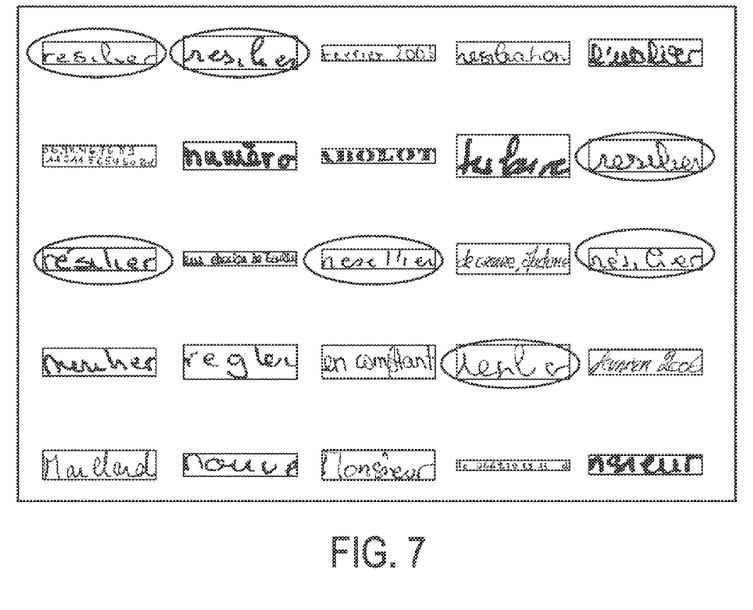
FIG. 7 illustrates the top twenty-five scoring matches for the query string "resilier", where only seven of the matches correspond to the query string.

In the best case (for the keyword abonnement) the 25 top scoring word images were correctly retrieved examples of the word. Even in the worst case, for the word résilier, the system was able to retrieve 7 correct examples among the 25 top scoring handwritten samples, at a labeling cost of zero.

For comparison, the mAP performances across all the keywords was determined for a comparative word spotting system using actual handwritten examples of the keywords. Cases where the SC-HMM is trained with 1 and 25 samples of each keyword, respectively, were evaluated. The training examples were selected randomly. Table 1 shows the mean of the mAP for ten keywords, together with the minimum and maximum mAP values.

TABLE I

| No. of training samples | Mean(mAP) | Min(AP) | Max(AP) |
|---|---|---|---|
| 1 | 17.6% | 10.8% | 23.8% |
| 25 | 64.1% | 62.1% | 66.1% |

As is evident from Table 1, a model trained on 25 actual handwritten samples of each keyword performs better, on average, than the exemplary system trained solely on nine synthesized training samples of each keyword. The cost of the comparative wordspotting system can be reduced by using only a single training sample, but the resulting loss in the performance is substantial and the performance is very dependent on the sample used, as is evident from the variation between Min(AP) and Max(AP). The exemplary system 10 trained with the 9 font images performs significantly better in terms of mAP than the conventional system trained with a single sample and does not require the previous availability of the example.

It will be appreciated that various of the above-disclosed and other features and functions, or alternatives thereof, may be desirably combined into many different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
receiving a query string;
generating a plurality of computer-generated images based on the query string with a computer typographic font, each of the plurality of computer-generated images being generated by varying the computer typographic font, the font variations having been identified based on a precision for retrieving word images which match at least one selected query string;
training a model based on the plurality of computer-generated images;
scoring candidate handwritten word images of a collection of handwritten word images using the trained model; and
based on the scores, identifying a subset of the word images.

2. The method of claim 1, further comprising:
outputting the identified subset of word images.

3. The method of claim 1, wherein the receiving of the query string is performed prior to training of the model based on the plurality of computer-generated images.

4. The method of claim 1, wherein the model comprises a first model which is trained on the plurality of computer-generated images and a second model which has been trained on a collection of sample handwritten word images and wherein the score of each word image is a function of a computed likelihood of the word image with respect to the first model and a computed likelihood of the word image with respect to the second model.

5. The method of claim 1, wherein the model comprises a semi-continuous hidden Markov model and optionally further comprises a Gaussian mixture model.

6. The method of claim 1, wherein the generating of the plurality of computer-generated images based on the query string comprises generating binary images of a fixed pixel height in pixels and wherein the candidate handwritten word images are normalized to the same fixed pixel height and are binary images.

7. A non-transitory computer program product encoding instructions, which when executed on a computer causes the computer to perform the method of claim 1.

8. The method of claim 1, further comprising:
extracting the collection of candidate handwritten word images from at least one document.

9. The method of claim 8, wherein the extracting comprises scanning at least one handwritten document and segmenting the scanned handwritten document.

10. The method of claim 1, wherein the training of the model based on the plurality of computer-generated images comprises extracting features from patches of the plurality of computer-generated images.

11. The method of claim 10, wherein the extracting features from patches of the plurality of computer-generated images comprises translating the image stepwise with a window of fixed height and width and at each step, extracting a patch.

12. The method of claim 1, wherein:
the generating of the plurality of computer-generated images based on the query string includes, for each of a set of fonts, automatically generating images based on the query string;
the training of the model based on the plurality of computer-generated images includes modeling the query string with a semi-continuous hidden Markov model, a subset of the parameters of the semi-continuous hidden Markov model being estimated based on features extracted from the images in the different fonts, and other parameters of the semi-continuous hidden Markov model being previously trained on sample handwritten word images without consideration of the query string;

the scoring of the candidate handwritten word images includes scoring candidate handwritten word images of the collection against the trained semi-continuous hidden Markov model; and the identifying of the subset of the word images based on the scores includes labeling one or more of the candidate handwritten word images, or a document containing one or more of the candidate handwritten word images.

13. The method of claim 12, wherein the subset of parameters includes transition probabilities and mixture weights and the other parameters include means and covariance matrices.

14. The method of claim 1, wherein the collection of candidate handwritten word images comprises images extracted from at least one document.

15. The method of claim 14, further comprising:
implementing a computer implemented process for at least one document from which a word image of the identified subset of the candidate handwritten word images was extracted.

16. The method of claim 15, wherein the computer implemented process comprises displaying at least that portion of the document from which the word image was extracted.

17. The method of claim 15, wherein the computer implemented process comprises processing a document which contains one of the subset of candidate word images differently from a document which does not.

18. A computer implemented processing system comprising:
a synthesizer which synthesizes a plurality of computer-generated images based on a received query string with a computer typographic font, each of the plurality of computer-generated images being generated by varying the computer typographic font, the font variations having been identified based on a precision for retrieving word images which match at least one selected query string;
a model which is trained on features extracted from the plurality of computer-generated images; and
a scoring component which scores candidate handwritten word images of a collection of candidate handwritten word images against the model and, based on the scores, identifies a subset of the handwritten word images.

19. The processing system of claim 18, further comprising:
a document segmentor which processes an input document image to identify the candidate handwritten word images.

20. The processing system of claim 18, further comprising:
a features extractor which extracts the features of the plurality of computer-generated images and the candidate handwritten word images.

21. The processing system of claim 18, further comprising:
a document tagger which labels documents or portions thereof which contain at least one of the subset of handwritten word images.

22. The processing system of claim 18, wherein the model comprises a semi-continuous hidden Markov model which includes a background model trained on sample handwritten word images prior to receipt of a query string.

23. A method comprising:
receiving a query string;
generating a plurality of computer-generated images based on the query string, each of the plurality of computer-generated images being generated by varying a selected computer typographic font;
training a model based on the plurality of computer-generated images in the different fonts;
scoring candidate handwritten word images of a collection of handwritten word images using the trained model; and
based on the scores, identifying a subset of the word images.

24. The method of claim 23, further comprising identifying the set of fonts based on a precision of the set of fonts for retrieving word images which match at least one selected query string.

* * * * *